United States Patent [19]

Ormós et al.

[11] 3,938,259

[45] Feb. 17, 1976

[54] PROCESS FOR CONTINUOUS DRYING OF CHEMICAL PRODUCTS BY MILLING-FLUIDISATION

[75] Inventors: Zoltán Ormós; Béla Csukás, both of Veszprem; Béla Stefkó, Budapest; Károly Pataki, Veszprem; Tibor Blickle; József Felméri, both of Budapest, all of Hungary

[73] Assignees: Richter Gedeon Vegyeszeti Gyar Rt, Budapest; Magyar Tudomanyos Akademia Muszaki Kemiai Kutato Intezete, Veszprem, both of Hungary

[22] Filed: Dec. 16, 1974

[21] Appl. No.: 533,087

[30] Foreign Application Priority Data

Dec. 22, 1973 Hungary............... RI 532

[52] U.S. Cl.................................... 34/10; 432/14
[51] Int. Cl.² ............................................ F26B 3/08
[58] Field of Search.......... 34/10, 57 R, 57 D, 57 E; 432/197, 14, 15; 165/104

[56] References Cited
UNITED STATES PATENTS

| | | | |
|---|---|---|---|
| 2,774,661 | 12/1956 | White................................. | 432/14 |
| 3,411,465 | 11/1968 | Shirai................................. | 34/57 D |
| 3,584,848 | 6/1971 | Klyonaga et al. .................. | 34/57 E |
| 3,789,513 | 2/1974 | Mark................................... | 34/57 E |
| 3,795,058 | 3/1974 | Ganiaris............................. | 34/57 D |

Primary Examiner—John J. Camby
Attorney, Agent, or Firm—Young & Thompson

[57] ABSTRACT

A process for the continuous drying of chemical products by milling fluidization, in which a fluidized bed of particles of an inert carrier, e.g., quartz sand having a particle diameter of 0.5–1.0 mm., is maintained and the chemical product to be dried is introduced in a wet state, e.g., wet solid or paste or suspension, into the fluidized carrier bed. The chemical product dries on the surface of the inert carrier particles and dry particles of the chemical product leave the relatively large and heavy carrier particles and are carried off in the exit gas. The carrier particles, however, are too large and heavy to leave in the exit gas and so remain in the fluidized bed. If desired, the dried product particles can be further dried, for example by additional drying gas in a cyclone chamber, after which the dried particles are separated from the gas which can be vented and/or recycled.

6 Claims, 1 Drawing Figure

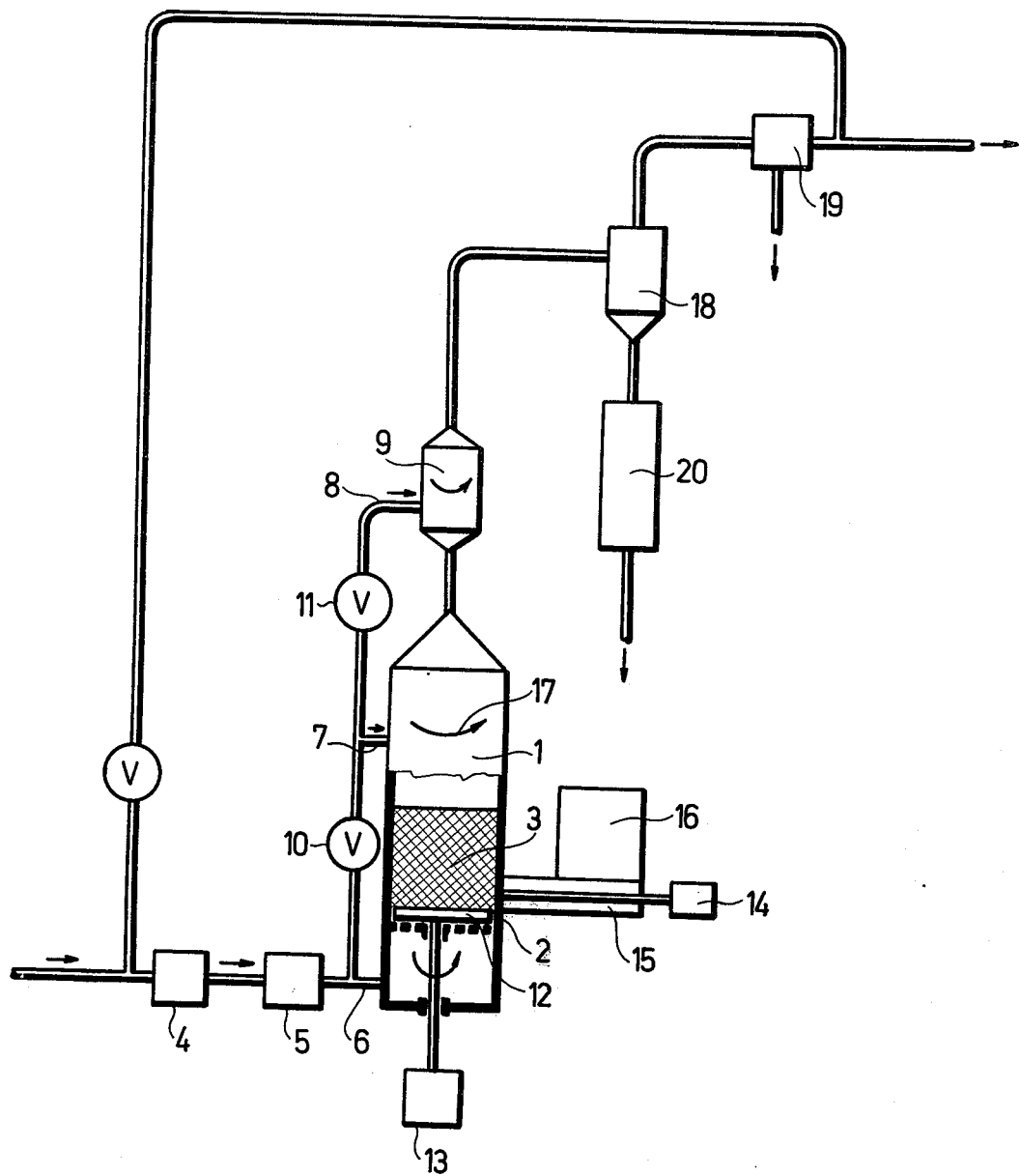

PROCESS FOR CONTINUOUS DRYING OF CHEMICAL PRODUCTS BY MILLING-FLUIDISATION

The invention concerns a process for continuous drying of chemical products by milling-fluidisation; more particularly, the invention relates to a continuous drying process for particulate materials, pastes or suspensions carried out in a fluidised layer which has a milling effect.

For drying wet particulate materials various technological chemical processes may be employed, such as processes employing: stationary layers, mechanically conveyed stationary layers, sliding layers, mechanical stirring, rolling layers, vibration, fluidisation, geyser layers, floating, pneumatic conveying and vortex layers /Blickle, T., Ormós, Z.: Energiagazdálkodás 13, 49 (1972)/, as well as spray dryers. The criteria for classifying drying devices vary and among them the one that has become particularly widespread is classification according to the method by which heat is transferred to the wet solid material (Perry, J. H.: Vegyészmérnökök kézikönyve, Műszaki Könyvkiadó, Budapest, 1969., p. 1327) (Chemical Engineers' Handbook by Perry, J. H. in Hungarian language).

Of through-flow drying apparatuses fluidisation dryers are very widely used and with them both batchwise and continuous operation may be achieved. When operating fludisation drying apparatuses for materials of high moisture content and small particle size lumps frequently appear, the particles agglomerate, adhere together and the fluidised state can only be achieved below a critical moisture content. As a consequence of the lump formation the drying time is very long which considerably reduces the capacity of the fluidisation drying apparatus and spoils the efficiency of heat utilisation. For maintaining adhered larger particles (agglomerates) in a fluidised state higher gas velocities are required and parallel with this there is a sudden jump in the mount of floating dust of relatively high moisture content which causes serious dust separation problems. The after-drying of the wet floating dust can be achieved in a pneumatic conveying tube connected between the drying apparatus and the dust separator but the fundamental problem, namely ensuring the fluidisational mobile state of the lumpy moist material, is extremely difficult and often unattainable. It has been attempted to solve this last problem by comminuting the adhered lumps during the drying process and returning them to the fluidisational dryer for further drying. The poor economy of this method is manifest. A further advance in the development of fluidisational drying apparatuses is represented by the use of auxiliary processes, such as the introduction of the use of mechanical stirring and vibration (U.S. Pat. No. 2,856,273) but these solutions merely ameliorate the problem associated with achieving the fluidisational drying of materials of high moisture contents, small particle size and proneness to forming lumps, and only infrequently provide a problem-free solution.

Pneumatic conveying devices are used not only for conveying the solids but also for drying, but for this only those free-flowing materials are suitable which are particulate and can dispersed in gases and which do not adhere to the walls of the conveying device and do not agglomerate (Perry, J. H.: Vegyészmérnökök kézikönyve, Műszaki Könyvkiadó, Budapest, 1969., p. 1962).

Materials of high moisture content and small particle size have a strong tendency to adherence and lump formation and therefore for these materials the possibilities of employing penumatic conveying and drying devices are extremely limited and can principally be used only as auxiliary process in conjunction with other, e.g. fluidisational, drying apparatus.

To dry paste-like materials of high moisture content and small particle size or particles in suspension can also be achieved with the aid of spray drying devices. The most important and most successful area of use of spray drying is for solutions, suspensions and pastes which cannot be dewatered mechanically, which are heat-sensitive or which contain exceptionally fine particles and agglomerates (Perry, J. H.: Vegyészmérnökők Kézikönyve, Műszaki Könyvkiadó, Budapest, 1969., p. 1767). One of the greatest problems in spray drying paste-like materials is the need to ensure adequate dispersion, i.e. spraying. In spray drying the particle size composition of the dry end-product is determined principally by the extent of the dispersion. If the requirement is that the particle size distribution of the dry material should be the same, to a good approximation, as the particle size distribution obtained during formation of the particles then the suspension or the paste must be dispersed to such an extent that in each drop or sprayed paste dispersion there should be one particle only, which is extremely difficult to achieve, requires high energy consumption, is costly, and is frequently an insoluble task. In addition to the difficulties of spraying pastes a further disadvantage of spray drying is the very high spatial requirement since this drying method requires a lot of room, consequently large-scale expensive installation and, in given cases, expensive buildings are needed.

From the point of view of costs spray drying is seldom of equal value with a two-stage dewatering (e.g. filtering and centrifuging) process or with drying of solid materials (Perry, J. H.: Vegyészmérnőkők kézikönyve, Műszaki Könyvkiadó, Budapest, 1969., p. 1767).

The aim of the invention is to provide a fluidisational process with which a dry mass of material of small particle size meeting the ever-increasing demands of quality can be produced economically in a single fluidisational drying device from one or more wet solid starting material(s) or suspension(s).

The invention is based on the discovery that by passing the wet solid material paste or suspension into the fluidised layer of an inert particulate charge (carrier) the conditions of intensive drying and the appropriate dispersion of the solid material to the desired extent may be simultaneously ensured. The introduced wet or paste-like solid material or suspension is uniformly distributed on the surfaces of the particles of the inert charge (carrier) in a fluidised layer as a consequence of the force and energy transfer due to the intensive fluidisational, mobile state; owing to the intensive gas-solid contact the wet material loses a considerable portion of its moisture content and the dry particles are continuously separated from the surfaces of the particles or the charge (carrier). The dried, separated and disintegrated particles which are smaller than the prescribed size are removed from the fluidised layer with the gas stream, provided that the velocity of the gas ensuring the fluidised state is greater than the discharge velocity of the particles of the carrier (auxiliary phase). The after-drying of the particles leaving the layer, and which in given cases may contain a few percent of moisture, can be achieved in the dilute phase of the fluidised layer or in the course of pneumatic conveying to a dust separator.

The essence of the process according to the invention therefore is that the wet, solid material or paste or suspension is fed into the particle layer of an inert charge (carrier) fluidised by gas. The wet solid or paste like material or suspension is uniformly distributed on the surfaces of the particles of the carrier in the fluidized layer due to the energy transfer from fluidisation and optionally from further energy transfer due e.g. to mechanical stirring or vibration, and after removal of a significant part of the moisture content the dry particles are separated from the surface of the particles of the carrier due to the disintegrating force effects and are removed from the fluidized layer with the gas stream. If so required, removal of the residual moisture content of the particles which are still wet to a very small extent and which have been discharged from the layer may be effected by conveying them in a gas stream to the upper space portion of the fluidisation device and/or into a pneumatic conveyor tube leading to a dust separator. In given cases this gas stream may be introduced tangentially.

In practice, according to the invention the selection of the charge (carrier) is extremely important. The quality requirements made on the charge (carrier) particles are manifold since on the one hand they must be chemically inert and in the other hand must have the appropriate physical properties. In selecting the inert carrier the following physical properties must be taken into account: particle size distribution, particle shape, specific gravity, rigidity and surface properties relative to wet materials.

The drying of paste-like materials of high moisture content and small particle size may be realized with a process according to the invention in the manner shown by way of example in the drawing.

In a cylindrical fluidization device 1 there is a perforated plate 2 and an acid-resistant steel screen to constitute an air distributor and a layer support on which is arranged a fluidized layer of the particles of the inert charge (carrier) 3. The air provided to ensure the fluidised mobile state and to remove the moisture is passed into the apparatus 1 and into an after-drying chamber 9 from a blower 4 and from there, after heating in steam oven 5, the air passes through air inlet pipes 6, 7 and 8 respectively. The ratio of the mass flow of the three air streams can be controlled by regulating valves 10 and 11. The air inlet pipes 7 and 8 are so constructed that the air enters the cylindrical space tangentially. A mechanical stirrer 12 rotatable in the fluidized layer is connected to be driven by an electric motor 13. A feed screw 15 driven by an electric motor 14 feeds the wet material to be dried from a container 16 and forces it in to the fluidised layer of the inert carrier particles which may be mechanically stirred. The dried particles of low moisture content separating from the particles of the inert carrier are removed from the fluidized layer by the air stream. The removal of the residual moisture content of the particles takes place in a vertical layer 17 formed above the fluidized layer and in the after-drying chamber 9 also having a vortical flow pattern. Depending on the quality of the material to be dried, principally its physical properties, frequently one or both of the vortical after-drying devices need not to be operated. From the after-drying chamber 9 the air stream containing dry-particles is vented to atmosphere via a cyclone 18 and a secondary dust separator 19. If desired a part of the air removed may be recycled, as can be seen by the dotted lines. A powder collector 20 serves to collect the dry product.

The advantages of a process according to the invention may be summarized as follows:

1. The process may be used for the single-stage, continuous drying of paste-like materials of high moisture content and small particle size, which materials exhibit a tendency to lumping and agglomeration;
   which in the course of drying agglomerate to such an extent that comminution is necessary during drying, or at the end of drying comminution has to be carried out in order to achieve the prescribed particle size;
   which can only be sprayed with difficulty or not at all;
   and which, due to their consistency and/or small particle size display poor fluidisation properties or cannot be brought into a fluidized state at all.

2. The particle size distribution of the dry material produced may be strongly influenced by altering the force effects due to disintegration which can be regulated by the appropriate choice of the material of the charge (carrier) particle size, particle shape and rigidity, the gas stream employed as well e.g. the shape and r.p.m. of the mechanical stirrer etc.

3. Among the advantages of the process according to the invention may also be listed that the drying and homogenisation of materials of fine particles can be carried out in a single stage if the wet solid materials or suspensions are fed in the desired ratio simultaneously into the fluidized layer of the inert charge (carrier).

4. The process is equally suitable for solving problems in the pharmaceutical, foodstuffs, organic and inorganic chemical industries as well as in other industries.

A few examples of carrying out the process according to the invention will now be described, merely by way of illustration but not of limitation:

EXAMPLE 1

In the course of drying centrifuge-wet 3,5-dichloro-2,6-dimethyl-pyridine the drying apparatus shown in the drying (with a diameter of the fluidized space of 0.3 m) was charged with an inert carrier of 8 kg of quartz sand with a particle size of 0.6–0.8 mm and was maintained in fluidised state by 180 $Nm^3/h$ air at 80°C. The mechanical stirrer rotating in the fluidized layer was adjusted to an r.p.m. of 70. In addition to the 180 $Nm^3/h$ of air at 80°C introduced through the pipe 6, 60 $Nm^3/h$ of air was introduced through pipe 7 and 30 $Nm^3/h$ through pipe 8, both air streams at 70°C. The air entered the space 17 above the layer and into the after-drying chamber 9 tangentially as a consequence of which in these spaces vortical flow was formed. From the container 16 of wet material 9 kg/h centrifuge-wet 3,5-dichloro-2,6-dimethyl-pyridine containing 50 percent by weight of water was fed by the feed screw 15 into the fluidized layer of the inert charge (sand). The particles containing a small amount of water, about 2–3 percent by weight were removed from the fluidized layer with the main air stream and after passing through the vortical afterdrying space portions 17 and 9 arrived at the cyclone separator 18 with a moisture content of 0.3–0.5 percent by weight, while a small part thereof passed to the dry dust separator 19. In the container 20 4.3 kg/h of dry material was collected the particle size distribution of which can be seen in Table I. The particle size distribution was determined by a microscopic method and recalculated to a percentage by weight composition.

Table I

| Particle size (μm) | Quantity (% by weight) |
|---|---|
| below 10 | 9 |
| 10–20 | 30 |
| 20–40 | 26 |
| 40–80 | 17 |
| 80–160 | 11 |
| above 160 | 7 |

After lengthy operation the weight of the particles in the fluidised layer was ascertained and was found to be 10 kg which means that the layer contained, relative to the sand fraction used as the inert charge, about 25 percent by weight of the material to be dried.

EXAMPLE 2

Centrifuge-wet 5(6)-benzoyl-2-benzimidazolyl-carbamic acid-methyl ester is dried in the drying apparatus as shown in the drawing (the diameter of the fluidizing space was 0.3 m) and as the inert carrier 12 kg of 0.6–0.8 mm particle size quartz sand is charged in. 80 Nm³/h air at 80°C was introduced below the layer support. The mechanical stirrer rotated in the fluidised layer had at 80 r.p.m. Through the pipe 6, 80 Nm³/h air at 80°C was passed above the fluidised layer, while 40 Nm³/h air at 80°C was introduced into the after-drying vortical chamber 9. The air was caused to enter tangentially into the space 17 above the fluidized layer and into the after-drying chamber 9. From the container 6 5 kg/h wet 5(6)-benzoyl-2-benzimidazolyl-carbamic acid-methyl ester was charged into the fluidised layer with the aid of feed screw 15. The dried particles containing about 3–5 percent by weight of water and separated from the particles surface of the carrier were after-dried in the vortical layer 17 above the fluidised layer and in the after-drying chamber 9. The product separated in the cyclone 18 had its moisture content reduced to 0.2–0.6 percent by weight. In the cyclone 18 2.4 kg/h 5(6)-benzimidazolyl-carbamic acid-methyl ester powder was separated, the remaining floating powder being removed from the air stream in a wet dust separator 19. Particle size distribution according to particle number in the dry material was determined by a particle analyser of the Leitz-Classimat type and is summarized in Table II.

Table II

| Particle size (μm) | The frequency function of the number distribution (%) |
|---|---|
| below 2 | 8 |
| 2–3 | 24 |
| 3–4 | 26 |
| 4–5 | 18 |
| 5–6 | 13 |
| 6–7 | 6 |
| above 7 | 4 |

The average particle size was 3.9 μm. In a stationary state the mass of the fluidized layer was 15.517 kg i.e. relative to the mass of the inert carrier the fluidized layer contained about 29 percent of material to be dried (the retention ratio of the carrier was 29 percent).

EXAMPLE 3

To prove that changing the technological parameters influences the particle size distribution of the dry product we modified the drying conditions of the 5(6)-benzoyl-2-benzimidazolyl-carbamic acid-methyl ester. Into the drying apparatus with a fluidisation space diameter of 0.3 m and constructed as shown in the drawing we charged 8 kg of quartz sand carrier with a particle size of 0.8–1.0 mm and fluidized it with air in the amount of 160 Nm³/h at 80°C. The r.p.m. of the mechanical stirrer in the course of this experiment was 50. In the space 17 above the fluidized layer the tangentially placed pipe 7 conveyed in air in the amount of 80 Nm³/h and at 80°C. From the container 16 for wet material the feed screw 15 pressed 8 kg/h centrifuge-wet 5(6)-benzoyl-2-benzimidazolyl-carbamic acid-methyl ester of 50 percent by weight moisture content into the fluidized layer. The particles leaving the fluidized layer and containing 2–5 percent by weight of water passed through the vortical after-drying space portions 17 and 9 and arrived into the cyclone 18, with a small part thereof into the wet dust separator 19 with a moisture content of about 0.3–0.6 percent by weight. In the cyclone 3.8 kg/h dry material was separated off. With the aid of a Leitz-Classimat type particle analyser the particle size distribution according to particle number was determined and the results are summarised, in Table III.

Table III

| Particle size (μm) | The frequency function of the number distribution (%) |
|---|---|
| below 4 | 7 |
| 4–6 | 19 |
| 6–8 | 23 |
| 8–10 | 21 |
| 10–12 | 13 |
| 12–14 | 10 |
| above 14 | 7 |

The average particle size was 8.4 um. By comparing Tables II and III it will be evident that as a result of changing the technological parameters the particle size of the dry product has approximately doubled: consequently the process is suitable for producing, starting from the same starting material, dry products with an average particle size meeting different requirements. After continuous and lengthy operation the equilibrium mass of the fluidized layer was 9.7 kg i.e. the mass of the charge in the layer increased by about 21 percent.

EXAMPLE 4

To dry centrifuge-wet calcium-monohydrogen-phosphate, $CaHPO_4 \cdot 2H_2O$, 14 kg quartz sand of 0.5–0.6 mm particle size was charged into the drying apparatus shown in the drawing and constructed with a diameter of 0.3 m in the fluidising space. Through the pipe 6, 150 Nm³/h air at 90°C was introduced to keep the layer in a fluidised state. The mechanical stirrer rotating in the fluidised layer has its r.p.m. set at 70. Through the pipe 7 above the fluidized layer 150 Nm³/h air at 90°C was introduced while in the after-drying vortical chamber 60 Nm³/h air at 90°C was introduced via the pipe 8. In the space 17 above the fluidized layer and into the after-drying chamber 9 the air was introduced tangentially to produce vortical flow. With the aid of feed screw 15, 18 kg/h wet calcium-monohydrogen-phosphate was passed from the container 16 into the fluidized layer with a moisture content of 40 percent by weight. The dry particles separated from the particle surfaces of the carrier were after-dried in the vortical layer 17 above the fluidized layer and in the after-drying chamber 9, were separated in the cyclone 18 and had a total mass of 10.7 kg/h with a moisture content of 0.1–0.8 percent by weight.

The residual floating powder was removed from the gas stream in a wet dust separator 19. The particle size distribution according to particle number determined by a particle analyser of the Leitz-Classimat type is summarized in Table IV.

Table IV

| Particle size ($\mu$m) | The frequency function of the number distribution (%) |
| --- | --- |
| below 4 | 3 |
| 4–6 | 7 |
| 6–8 | 12 |
| 8–10 | 17 |
| 10–12 | 23 |
| 12–14 | 14 |
| 14–16 | 11 |
| 16–18 | 8 |
| 18–20 | 5 |

The average particle size was 10.2 $\mu$m. In a stationary state the mass of the fluidized layer was 16.9 kg and thus relative to the mass of the inert carrier the equilibrium layer contained about 21 percent material to be dried (the retention ratio of the charge was about 21 percent).

Having described our invention, we claim:

1. A process for continuously drying chemical products by milling fluidization, comprising introducing a wet paste of the chemical product to be dried into a fluidized layer of particles of an inert carrier, introducing gas into the fluidized layer to agitate the fluidized layer so as uniformly to distribute said paste on the surface of the particles of the inert carrier, maintaining the flow of gas into said fluidized layer at a rate insufficient to remove said carrier particles from the fluidized layer but sufficient to separate dried particles of said chemical product from the particles of the inert carrier and to remove said dried particles of said product from said layer, and removing said particles of dried product from gas that has left said layer.

2. A process as claimed in claim 1, and stirring said fluidized layer mechanically with a solid stirrer disposed adjacent a screen above which said fluidized layer is located.

3. A process as claimed in claim 2, and introducing said paste by means of a screw conveyor into a lower portion of said fluidized layer at a point adjacent said solid stirrer.

4. A process as claimed in claim 1, and after-drying said product particles after removal from said layer.

5. A process as claimed in claim 1, in which said carrier particles are quartz sand having a diameter of about 0.5–1.0 mm.

6. A process as claimed in claim 1, and supplying heat to said fluidized layer by heating said gas to a temperature of about 80° to 90°C.

* * * * *